United States Patent

Ritter

[11] 3,717,354
[45] Feb. 20, 1973

[54] VEHICLE SUSPENSION SYSTEM
[75] Inventor: Thomas E. Ritter, Utica, Mich.
[73] Assignee: General Motors Corporation, Detroit, Mich.
[22] Filed: Aug. 26, 1971
[21] Appl. No.: 175,284

[52] U.S. Cl. ............................280/124 A, 267/20 A
[51] Int. Cl. ..............................................B60g 11/58
[58] Field of Search........280/124 A, 96.2; 267/60, 4, 267/56, 33, 34, 68, 20 A, 20 R

[56] References Cited

UNITED STATES PATENTS

| 2,916,282 | 12/1959 | Muller | 280/124 A |
| 134,646 | 1/1873 | Culmer | 267/4 |

*Primary Examiner*—Philip Goodman
*Assistant Examiner*—John Carroll
*Attorney*—W. E. Finken et al.

[57] ABSTRACT

An adjustable suspension system for a vehicle having a sprung mass and an unsprung mass, the suspension system including a control arm connected to the unsprung mass and supported on the sprung mass for pivotal movement about a fixed axis of the latter, a coil spring disposed in compression between the sprung mass and the control arm, and three circular spring seats centered on the longitudinal centerline of the control arm and spaced at different distances from the fixed pivot axis. The spring is adapted to seatingly engage the control arm on any one of the spring seats, each of which seats has a different linkage ratio so that as the spring is shifted between the various seats the curb height of the vehicle is altered. Abutments on the control arm prevent sliding of the compressed spring between the various seats and perforations on the control arm below the seats are adapted to receive a prying tool which is operative to force the spring over the abutments while the latter is under full load compression.

3 Claims, 5 Drawing Figures

INVENTOR.
Thomas E. Ritter
BY
Saul Schwartz
ATTORNEY

VEHICLE SUSPENSION SYSTEM

This invention relates generally to vehicle suspension systems and in particular to a coil spring type suspension system adapted for simple and speedy adjustment.

In recent years automobile manufacturers have greatly increased the number of body styles, engine options, and accessory options which may be installed on any given vehicle frame, the total combination, of course, making up the sprung mass of the vehicle which is to be suspended by the vehicle suspension system. Each of the various available combinations has a different total weight and, accordingly, requires a set of springs with rates differing from the corresponding springs associated with other accessory combinations if the resulting vehicles are to have the same curb heights. The resulting proliferation of different rate springs has created storage, inventory and handling problems for vehicle manufacturers. A suspension system according to this invention is adapted to be adjusted so that a single spring is operative to support a range of sprung mass weights at a given curb height, the total number of different rate springs which must be stocked thus being significantly reduced.

The primary feature of this invention is that it provides an improved vehicle suspension system. Another feature of this invention is that it provides a vehicle suspension system of the type including a control arm attached to the unsprung mass and pivotally supported on the sprung mass and a spring member disposed between the control arm and the sprung mass wherein the point of engagement between the spring member and the control arm may be manually adjusted to alter the linkage ratio of the suspension system. Still another feature of this invention resides in the provision on the control arm of a spring seat having a plurality of pairs of abutments located on opposite sides of a corresponding number of secondary spring seats adapted to receive the end coil of a coil suspension spring, the secondary seats being unequally spaced from the control arm pivot axis for effecting alteration of the linkage ratio of the suspension system. A still further feature of this invention resides in the provision of a plurality of slots in the control arm generally below the various secondary spring seats, the slots being adapted to receive therethrough a prying tool operative to shift the end coil of the suspension spring from one secondary seat to another while the spring is maintained under full load compression.

These and other features of this invention will be readily apparent from the following specification and from the drawings wherein.

Figures 1, 2, 3:
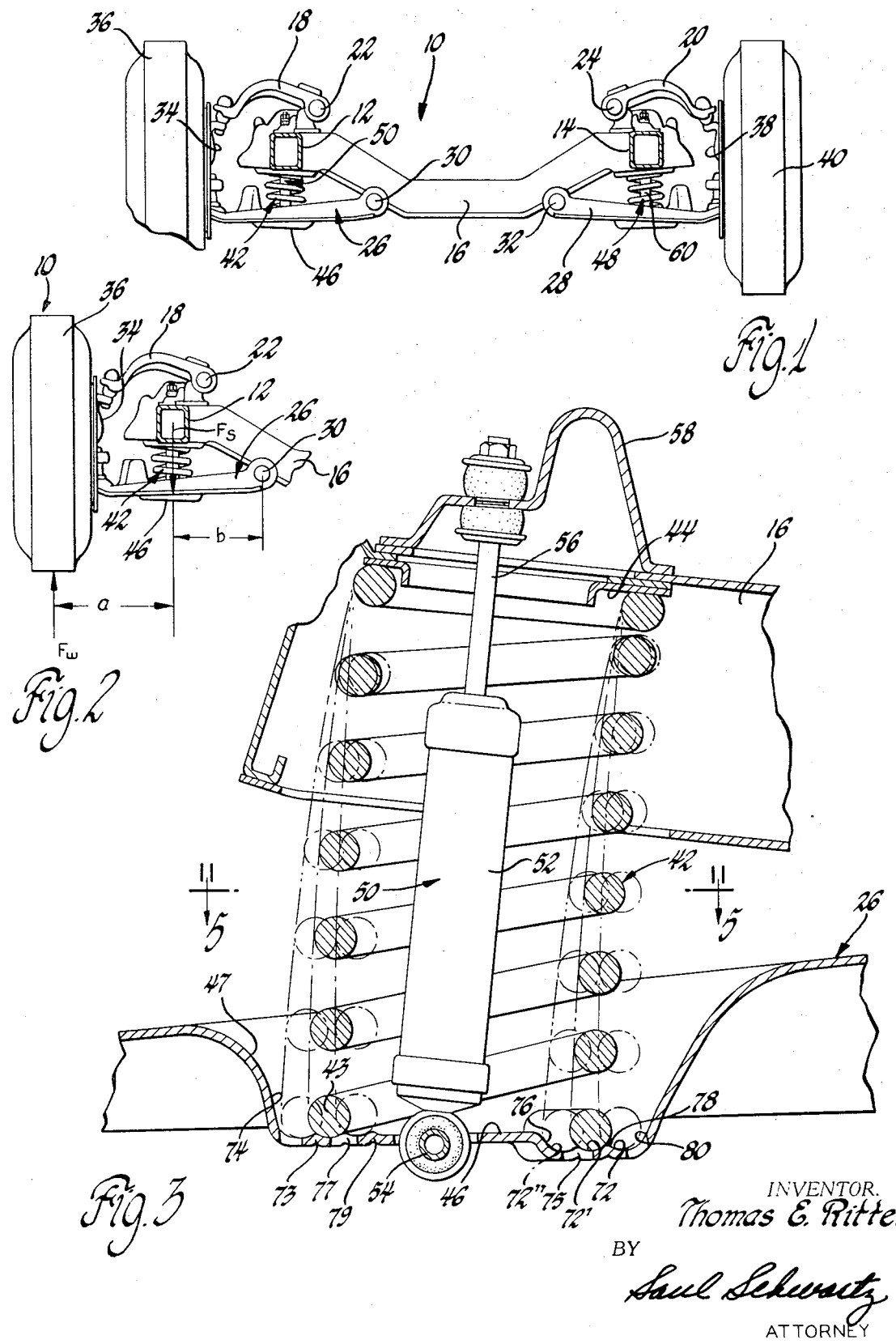
FIG. 1 is a front elevational view of a vehicle independent front suspension system according to this invention.
FIG. 2 is similar to FIG. 1 but showing only one-half of the suspension system.
FIG. 3 is an enlarged view of a portion of FIG. 1 showing in vertical section the adjustable spring portion of the suspension system.

Referring to FIG. 1 of the drawings, there shown is an independent front suspension system designated generally 10 adapted to resiliently support the forward portion of the sprung mass of an automobile type vehicle above the front steerable road wheels of the vehicle. The sprung mass of the vehicle includes a frame having a pair of rigid longitudinally extending side rails 12 and 14 interconnected adjacent their forward ends by a rigid cross member 16. A pair of upper control arms 18 and 20 are pivotally supported on the cross member at 22 and 24, respectively. A pair of lower control arms 26 and 28 are pivotally supported on the cross member 16 at 30 and 32, respectively. Upper arm 18 and lower arm 26 cooperate in a conventional manner to pivotally support a steering knuckle 34, the knuckle 34 rotatably supporting a left front steerable road wheel 36. Similarly, the upper arm 20 and the lower arm 28 cooperate in pivotally supporting a steering knuckle 38 which rotatably supports a right front steerable road wheel 40.

As seen in FIGS. 1 and 3, a coil suspension spring 42 having a bottom coil 43 is disposed in compression between an upper spring seat 44 on the cross member 16 and a lower spring seat 46 formed in a depression 47 in the lower control arm 26. A second coil spring 48, FIG. 1, is similarly disposed in compression between a spring seat on the cross member and a spring seat on the lower control arm 28, the latter two spring seats being identical to the seats 44 and 46, respectively. A shock absorber 50, including a cylinder 52 anchored to the control arm 26 at 54 and a piston rod 56 anchored to a bracket 58 rigidly affixed to the cross member 16, is disposed within the spring 42 and functions in a conventional manner to damp the oscillations of the spring. A similar shock absorber 60 is disposed within spring 48 on the opposite side of the vehicle.

Referring particularly to FIG. 2, the linkage ratio of each side of the suspension system determines the magnitude of the compressive load experienced by the corresponding coil spring and, consequently, the curb height above the road surface at which the sprung mass of the vehicle is supported. More precisely, assuming that the arrow designated $F_w$ represents the vertical force reaction of the road on the wheel 36, that the arrow designated $F_s$ represents the opposing force reaction of the coil spring 42 on the lower control arm 26, that $b$ represents the lever arm of force $F_s$ with respect to control arm pivot 30, and that $a$ represents the distance between the forces $F_s$ and $F_w$, the process of summing moments experienced by control arm 26 about the pivot 30 results in the equation $F_s = F_w(1 + a/b)$. The term $a/b$ represents the linkage ratio of the left side of the suspension system. For any given weight of the sprung mass of the vehicle, the magnitude of force $F_w$ is constant and equals approximately one quarter of the total unsprung weight. It follows, then, that the magnitude of force $F_s$ is a function of the linkage ratio, the magnitude of force $F_s$ also being the magnitude of the compressive load experienced by spring 42. Accordingly, as the distance $b$ increases, the value of the linkage ratio decreases with a corresponding decrease in the magnitude of force $F_s$. Similarly, as the distance $b$ decreases, the value of the linkage ratio increases with a corresponding increase in the magnitude of force $F_s$. Since the length of the spring 42 varies inversely with respect to the magnitude of the compressive load experienced thereby, increasing and decreasing the linkage ratio results, respectively, in a decrease and an increase in the length of the spring. Thus, by shifting the coil spring 42 inboard or outboard with respect to the control arm pivot 30, the curb height of the vehicle can be altered.

Figure 4:
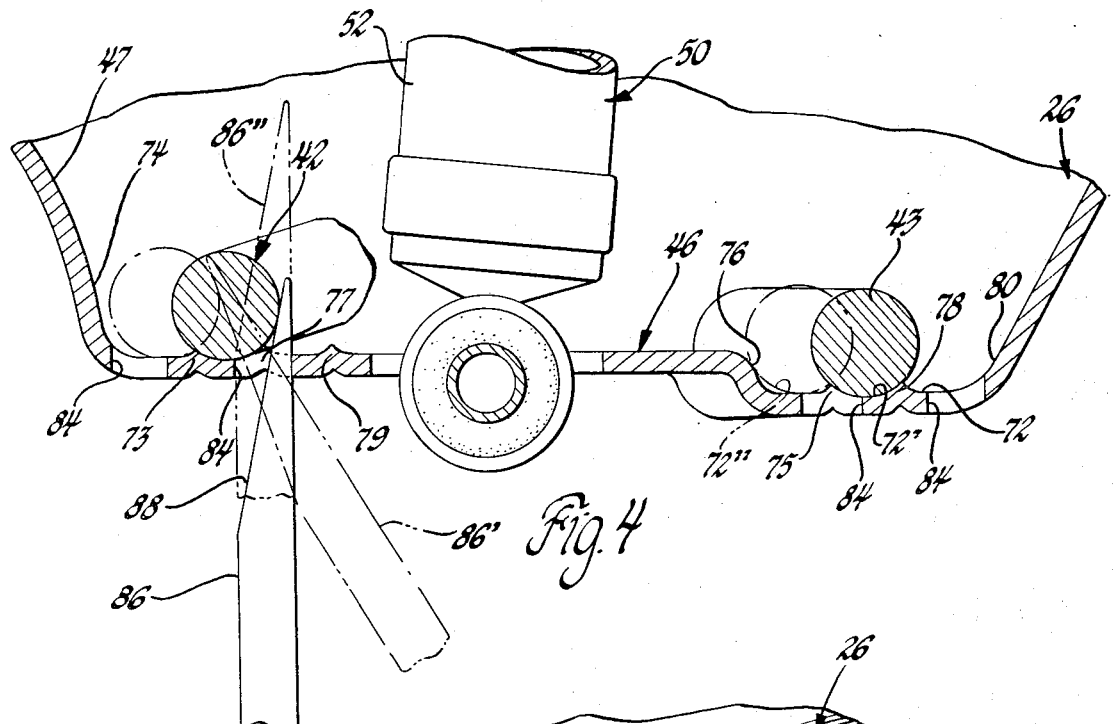
FIG. 4 is an enlarged view of the lower portion of FIG. 3.
Figure 5:
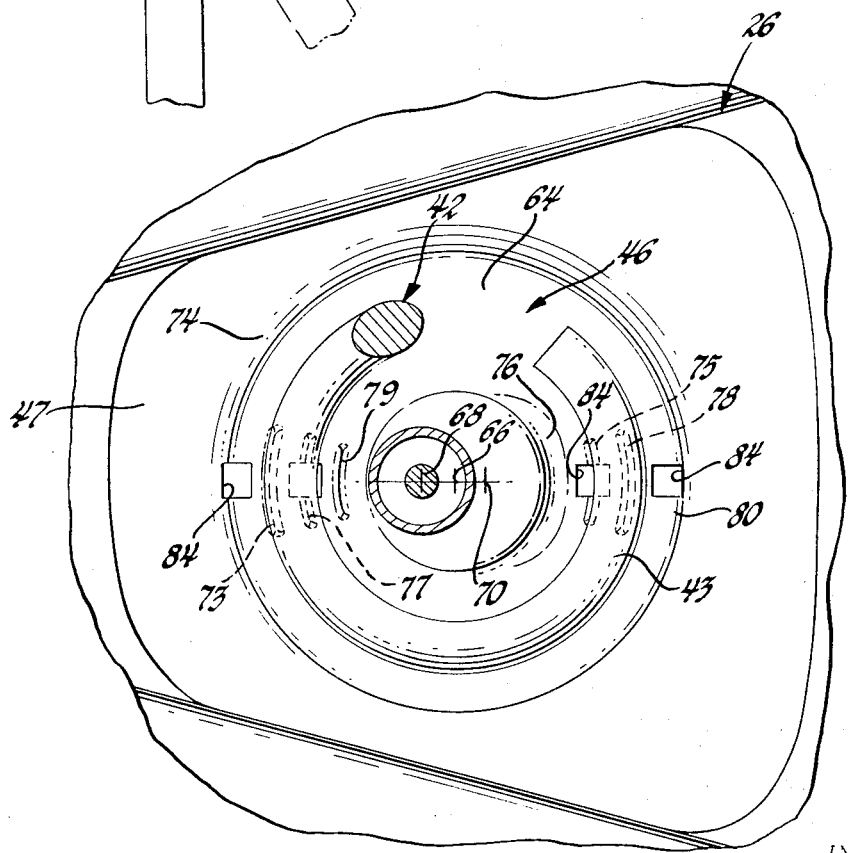
FIG. 5 is an enlarged sectional view taken generally along the plane indicated by lines 5—5 in FIG. 3.

As seen best in FIGS. 3, 4 and 5, the suspension system 10 incorporates at each side of the vehicle a simple and practical arrangement for utilizing the curb height variation effect of changes in the linkage ratio. More particularly, describing only the left side of the suspension system since the right side is identical thereto, the spring seat 46, disposed in the depression 47 in the control arm 26, is generally circular in configuration with a diameter substantially larger than the diameter of the coil spring 42. The seat 46 includes an annular supporting surface 64, FIG. 5, of width generally equal to three times the diameter of the wire or rod from which the coil spring is fabricated, the surface 64 being formed in a partial helix to conform to the bottom coil 43 of the spring, FIGS. 3 and 4.

As seen best in FIG. 5, the surface 64 has superimposed thereon a first imaginary circle centered at 66 on the centerline of the control arm extending longitudinally thereof and having a diameter equal to the diameter of the coil spring 42. A second imaginary circle centered at 68 on the longitudinal centerline and also having a diameter equal to the diameter of coil spring 42 is superimposed on the surface 64 and overlaps the first circle. Similarly, a third imaginary circle centered on the longitudinal centerline of the control arm inboard of center 66 at 70 and also having a diameter equal to the diameter of coil spring 42 is superimposed on the surface 64 and overlaps the first and second circles. The three superimposed circles define on the spring seat 46 three separate secondary spring seats 72, 72', and 72'' for the bottom coil 43 of spring 42, each of the secondary seats being spaced inboard or outboard of the others with respect to the control arm pivot 30.

Referring to FIG. 3, the length of the coil spring 42 is significantly greater than the distance between secondary seats 72 and 72'' through which the bottom coil 43 travels. Accordingly, the change in the angle of the line of action of the coil spring is relatively insignificant so that, for all practical purposes, shifting only the lower coil 43 between the secondary seats 72, 72' and 72'' is equivalent to bodily moving the entire spring inboard or outboard with respect to the control arm pivot 30.

Recalling now the relation between the linkage ratio and the magnitude of the compressive force experienced by the coil spring 42, it is seen that when the lower coil 43 is seated in secondary seat 72', the sprung mass of the vehicle is maintained at an initial predetermined curb height determined by the rate of the coil spring and the linkage ratio of the spring seat 72'. When the lower coil 43 is shifted inboard from secondary seat 72' to secondary seat 72, the linkage ratio increases causing a corresponding increase in the magnitude of the compressive load on the coil spring and a consequent decrease in the length thereof and a lowering of the curb height of the sprung mass relative to the initial curb height. In a similar manner the curb height of the sprung mass is increased relative to the initial curb height by shifting the lower coil 43 from secondary seat 72' to secondary seat 72''. It will, of course, be apparent to those skilled in the art that alteration of the linkage ratio by shifting the lower coil 43 between the various secondary seats can be utilized to maintain sprung masses of different weights at a constant curb height.

Referring again to FIGS. 3, 4 and 5, the lower coil 43 of the spring is maintained in any one of the various secondary seats by an arrangement of abutments aligned along the longitudinal centerline of the control arm 26. More particularly, the secondary seat 72'' lies between a raised arcuate abutment 73 and a shoulder 74 of the control arm and between a raised arcuate abutment 75 and another shoulder 76 of the control arm. Similarly, the secondary seat 72' lies between the abutment 73 and another arcuate abutment 77 and between abutment 75 and another abutment 78. Finally, the secondary seat 72 lies between the abutment 77 and a single raised arcuate abutment 79 and between abutment 78 and another shoulder 80 of the control arm. The substantial compressive forces experienced by the spring function to always maintain the lower coil 43 in seating engagement on the control arm and the abutments and shoulders prevent the lower coil from sliding across the control arm between the various secondary seats. Consequently, no external clamping devices or holding means are necessary.

As best seen in FIGS. 4 and 5, the control arm 26 has a plurality of generally square perforations 84 therein aligned in spaced relation on the longitudinal centerline of the control arm. The perforations 84 underlie respective ones of the secondary seats in predetermined relation thereto and are adapted for reception of a tool 86 having a bevelled end 88 thereon. Referring particularly to FIG. 4, when the lower coil 43 is seated in secondary seat 72', for example, and the tool 86 is inserted in the proper perforation 84, the bevelled surface 88 of the tool engages the side of the coil and a fulcrum is formed by the inside edge of the perforation. When the tool is pivoted counterclockwise from the solid to the broken line position 86' about the axis defined by the side of the perforation, a substantial horizontal force is applied to the lower coil 43 which is sufficient to cam the lower coil over the abutments 73 and 75 separating secondary seats 72' and 72''. The lower coil 43 is similarly shiftable to any of the other secondary seats by proper manipulation of the tool when the latter is inserted in the proper one of the perforations. Alternatively, the tool 86, instead of being pivoted, may merely be forced vertically up from the solid line position to the broken line position 86''. During such vertical movement of the tool the lower coil 43 is wedged leftwardly until it snaps over the abutments 73 and 75.

Having thus described the invention, what is claimed is:

1. In a suspension system for a vehicle having a sprung mass and an unsprung mass, said suspension system including a control arm connected to said unsprung mass and supported on said sprung mass for pivotal movement about a fixed axis of the latter, the combination comprising, means on said control arm defining a plurality of spring seats centered generally on the longitudinal centerline of said control arm at different distances from said fixed pivot axis, the distance between said fixed pivot axis and the center of each of said spring seats determining the suspension system linkage ratio for the corresponding one of said spring seats, a spring member disposed between said sprung mass and said control arm and adapted to seatingly engage the latter on any one of said spring seats thereby to resiliently support said sprung mass at a predetermined curb height corresponding to the linkage ratio of said one spring seat, said spring member supporting said sprung mass at a different curb height when seatingly engaging said control arm on another of said spring seats having a correspondingly different linkage ratio, and means operable to maintain said spring member seatingly engaged on any selected one of said spring seats during operation of said vehicle.

2. In a suspension system for a vehicle having a sprung mass and an unsprung mass, said suspension system including a control arm connected to said unsprung mass and supported on said sprung mass for pivotal movement about a fixed axis of the latter, the combination comprising, means on said control arm defining a plurality of circular spring seats centered on the longitudinal centerline of said control arm at different distances from said fixed pivot axis, the distance between said fixed pivot axis and the center of each of said spring seats determining the suspension system linkage ratio for the corresponding one of said spring seats, a cylindrical coil spring having a diameter generally equal to the diameters of said spring seats disposed in compression between said sprung mass and said control arm and adapted to seatingly engage the latter on any one of said spring seats thereby to resiliently support said sprung mass at a predetermined curb height corresponding to the linkage ratio of said one spring seat, said spring member supporting said sprung mass at a different curb height when seatingly engaging said control arm on another of said spring seats having a correspondingly different linkage ratio, and holding means responsive to the compression experienced by said spring and operative to maintain the latter seatingly engaged on any selected one of said spring seats during operation of said vehicle.

3. In a suspension system for a vehicle having a sprung mass and an unsprung mass, the combination comprising, a control arm attached to said unsprung mass and supported on said sprung mass for pivotal movement about a fixed axis of the latter, means on said control arm defining three circular spring seats centered on the longitudinal centerline of said control arm at three different distances from said fixed pivot axis, each of said three different distances determining the suspension system linkage ratio for the corresponding one of said three spring seats, a cylindrical coil spring having a diameter generally equal to the diameters of said spring seats disposed in compression between said sprung mass and said control arm and adapted to seatingly engage the latter on any one of said three spring seats thereby to resiliently support said sprung mass at a predetermined curb height corresponding to the linkage ratio of said one spring seat, said spring member supporting said sprung mass at a different curb height when seatingly engaging said control arm on another of said three spring seats having a correspondingly different linkage ratio, means defining a plurality of arcuate raised abutments on said control arm situated between said three spring seats and separating the latter to prevent sliding movement of said spring across said control arm between said three spring seats so that said spring is maintained in seating engagement on any selected one of said three spring seats during operation of said vehicle, and means defining a plurality of perforations in said control arm adapted to receive therein a tool engageable on said spring and on said control arm, said tool being actuable to shift said spring from one of said three spring seats to another by forcing said compressed spring over corresponding ones of said abutments.

* * * * *